L. L. LAWRENCE & G. S. THOMAS.
Corn-Planter.
No. 159,939.
Patented Feb. 16, 1875.
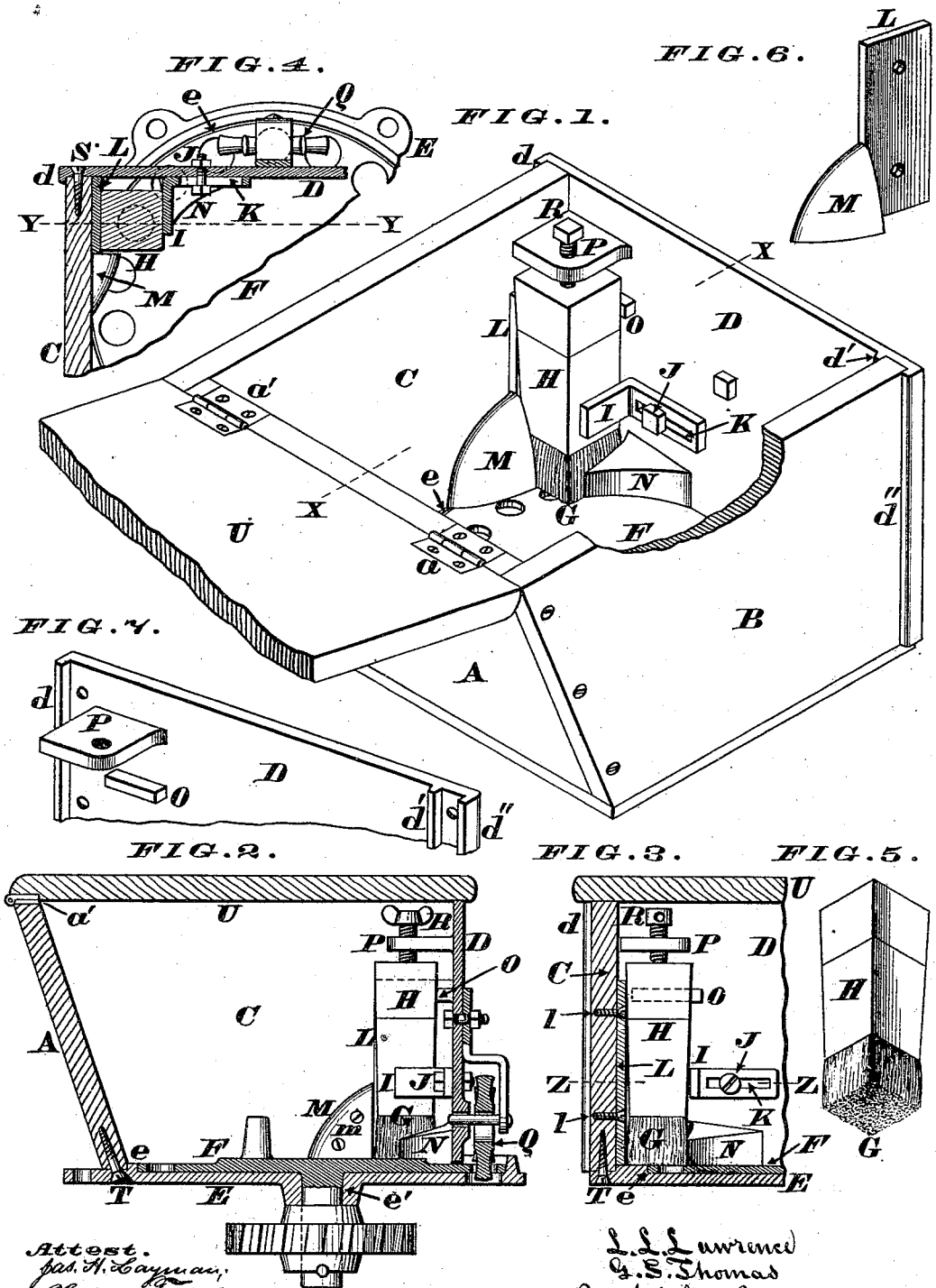

UNITED STATES PATENT OFFICE.

L. LOVELL LAWRENCE AND GEORGE S. THOMAS, OF DUBLIN, INDIANA, ASSIGNORS TO WAYNE AGRICULTURAL COMPANY, OF SAME PLACE.

IMPROVEMENT IN CORN-PLANTERS.

Specification forming part of Letters Patent No. 159,939, dated February 16, 1875; application filed January 2, 1875.

*To all whom it may concern:*

Be it known that we, L. LOVELL LAWRENCE and GEORGE S. THOMAS, both of Dublin, Wayne county, Indiana, have invented a new and useful Improvement in Corn-Planters, of which the following is a specification:

Our invention is particularly intended as an improvement on the corn-planter described in Patent No. 140,493, granted to Fulghum and Lawrence, July 1, 1873; and our improvement chiefly relates to the hopper or receptacle for the seed and the cut-off mechanism, the invention including means for securing regular and certain delivery, without liability to bank the corn behind the cut-off brush, or to crowd the latter too closely upon the cell-plate.

Parts not herein specifically described may be constructed in accordance with the subject-matter of the patent to Fulghum and Lawrence aforesaid.

In the accompanying drawing, Figure 1 is a perspective view of our hopper, with the lid thrown back, and a portion of one of the wooden sides broken away. Fig. 2 is a section on the line $xx$. Fig. 3 is a section on the line $yy$. Fig. 4 is a section on the line $zz$. Fig. 5 shows the brush detached. Fig. 6 is a perspective view of the cheek-plate detached from the hopper. Fig. 7 is a perspective view of the upper portion of the rear plate of hopper.

Our hopper is formed preferably with three wooden sides, of which the front one A slopes inward, while the others, B and C, may be vertical, or nearly so. The rear side D is preferably of cast-iron, and is likewise vertical. Projecting from the front side of plate D are vertical flanges $d$ $d'$ $d''$, between which the sides B and C are fitted, said wooden sides being maintained in position by means of screws S. The hopper-bottom consists of a plate, E, of cast-iron, which plate has a circular depression, $e$, which is occupied by a circular cell-plate, F, whose thickness is such as to cause its top to be about flush with the upper surface of bottom plate E when in place. A portion of the hopper-bottom and of the cell-plate extend to rear of the back plate of hopper, so as to expose the filled cells to view, and to permit the application of a force feed-wheel or spider, Q, such as described in Patent 140,493 aforesaid. A circular hole, $e'$, in the center of the hopper-bottom, contains the shaft of the cell-plate. Our cut-off brush G is square, and has a square shank, H, and is confined in the rear right-hand corner of the hopper by the following means: I is a clamp-hook, capable of being firmly secured to the hopper-back by means of a screw, J, which occupies slot K, that permits the said clamp to be shifted toward or from the brush. The brush, having been inserted, is tightly griped to its place by the screw J, operating through the instrumentality of the clamp aforesaid on one side of it, and a cheek-plate, L, on the other side. The plate L is secured to the hopper-side by means of wood-screws $l$, or otherwise. The brush proper is held compactly to its proper square form by means of a wedge-formed tongue or fender, M, that projects from the edge of cheek L, and an ear, N, that projects from the hopper-back, and which, being hollow, permits the outward passage of the plate F with its charged cells. A projection, O, from the hopper-back, serves to tip the shank of the brush slightly forward, so as to cause the forward or receiving edge of the brush to press closely upon the cell-plate, and effectually cut off or divert any excess of seed from entering the successive cells. A lug, P, projecting from the hopper-back, has tapped within it a screw, R, whose point is made to press upon the top of brush-shank, and to thereby insure the proper pressure of the point of the brush upon the cell-plate. In order, however, to guard against the pressure being at any time excessive, one-half only of the brush-point bears upon the cell-plate, the remaining half resting upon the hopper-bottom, which is thus made effective as a gage for the brush. The part of the brush-point which is not in contact with the cell-plate will of course be free from wear, and, after the other portion has become worn, can be brought into service by temporarily releasing the brush and turning it half around.

The cheek L may be dispensed with, and the fender M be fastened directly to the hopper-side by screws $m$, as seen in Fig. 2.

T are screws for securing the wooden portions A B C of the hopper to the metallic bottom plate E. U is the lid of the seed-box, said lid being hinged to the front of the box at $a\ a'$.

We claim as new and of our invention—

1. The fender M, in combination with the revolving cell-plate F and square cut-off brush G H.

2. In the described combination with cut-off brush G H and set-screw P, the revolving cell-plate F and the hopper-bottom E, each occupying half the area of the brush-point, as and for the purpose set forth.

3. The combination, with cut-off brush G H, of clamp I J K, fender M, and ear N, substantially as set forth.

In testimony of which invention we hereunto set our hands.

L. LOVELL LAWRENCE.
GEORGE. S. THOMAS.

Attest:
GEO. H. KNIGHT,
THOS. UNDERWOOD.